Patented Nov. 17, 1936

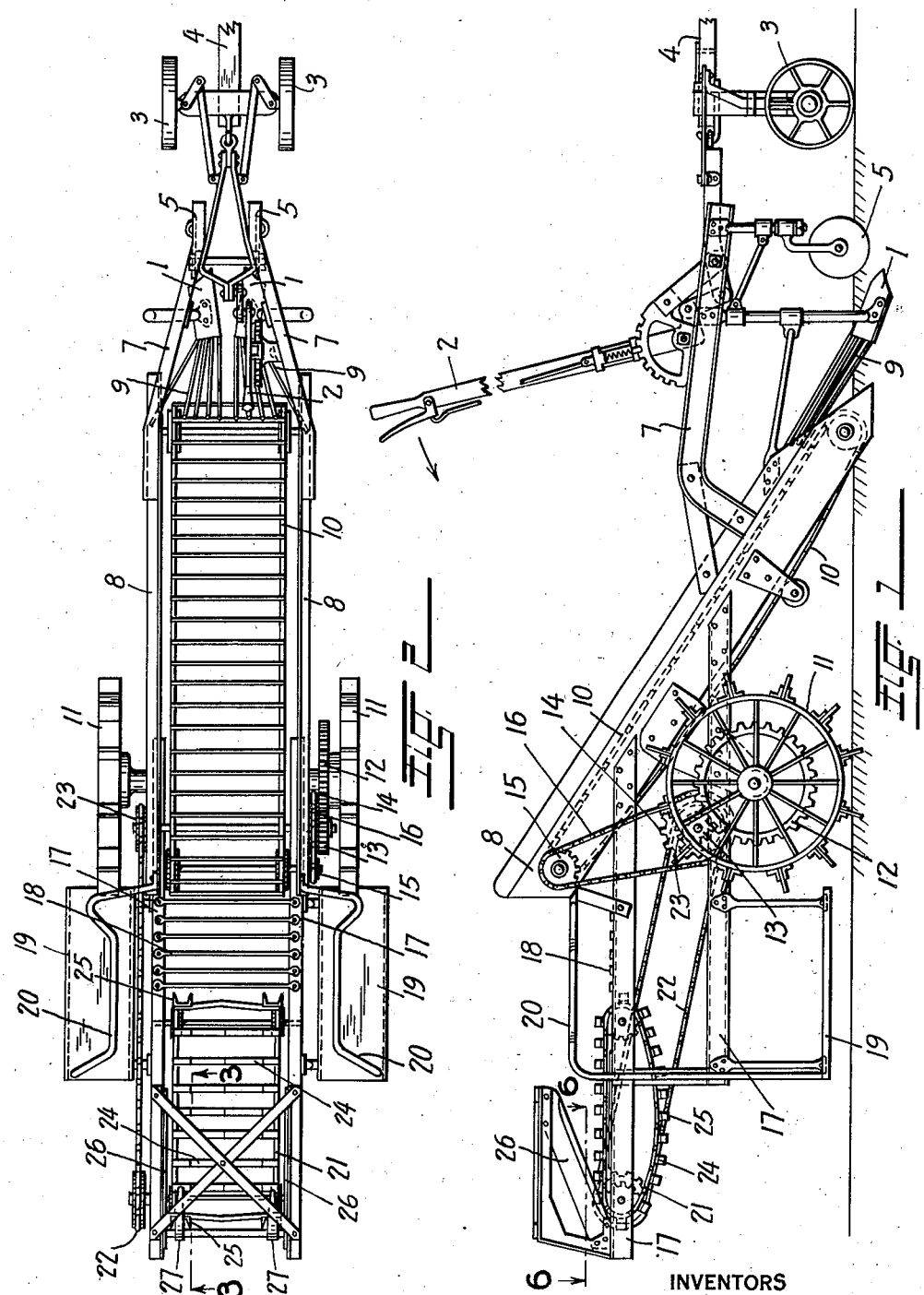

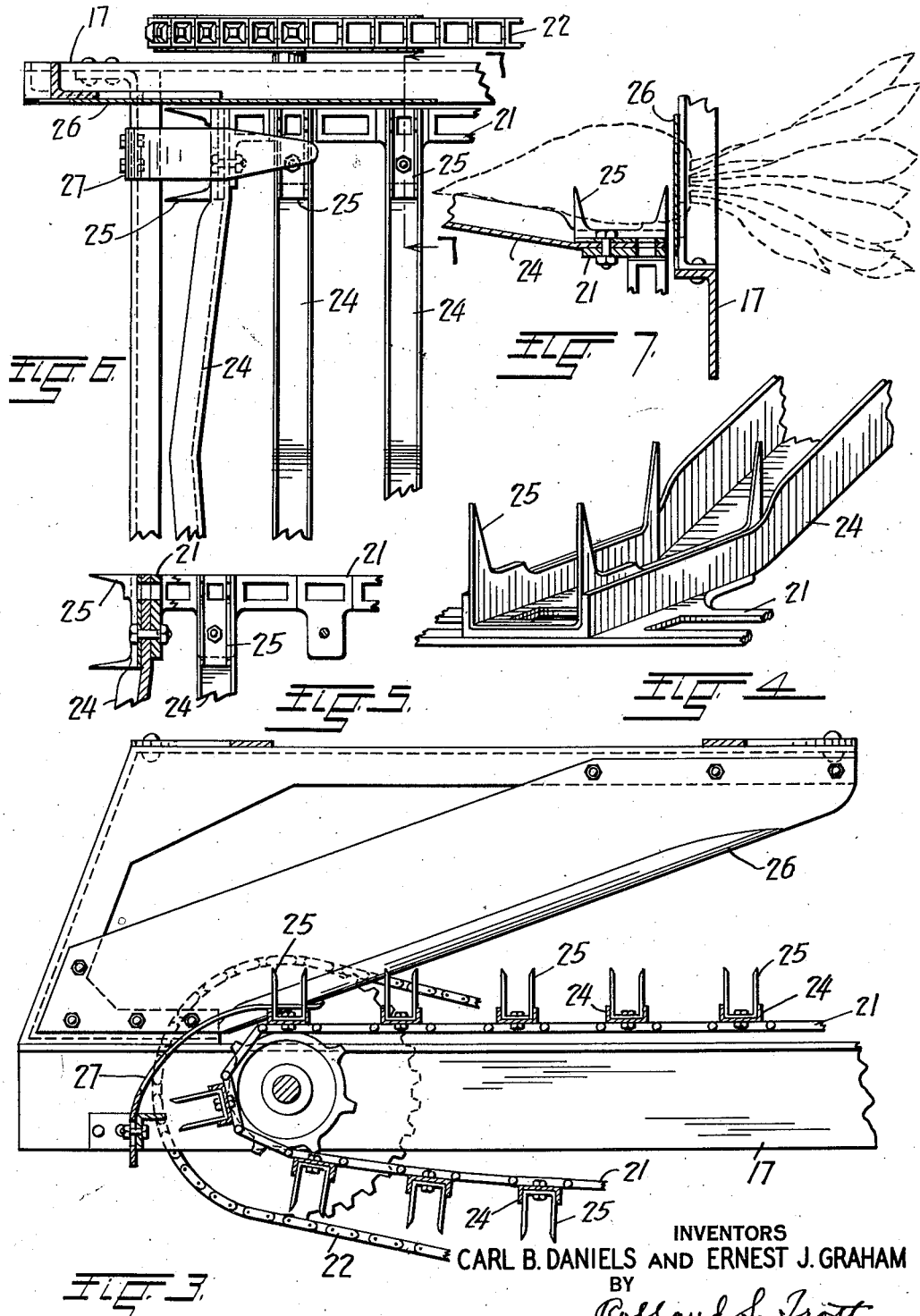

2,061,395

UNITED STATES PATENT OFFICE 2,061,395

BEET TOPPING DEVICE

Carl B. Daniels and Ernest J. Graham,
Denver, Colo.

Application January 11, 1934, Serial No. 706,178

8 Claims. (Cl. 146—85)

Our invention relates to a sugar beet harvesting process and to a machine by the aid of which our process may be carried out.

More particularly our invention relates to a process and to a machine by which beets may be pulled, the earth freed therefrom, the tops removed at the proper height, and the tops and beets separated.

A great many beet machines have been invented or developed, but none of them so far have been perfect enough to have been much of a commercial success.

Beets, when they are in the ground ready for the harvesting are not uniform enough in lateral position, in height, or in size to conform properly to the necessary uniform action of any purely mechanical machine. That is, a machine that would dig or pull the beets from the ground and properly top the high beets and the low beets, the beets in line and the beets out of line, the large beets and the small beets, must act almost as if it had human intelligence, and so far no such machine has been put upon the market.

One of the factors which adds to the difficulty of any purely mechanical machine is as follows:—

If a beet is topped too far down, too much of the beet is lost and the net tonnage per acre of beets which the farmer is able to sell to the sugar factory may thereby be considerably reduced.

On the other hand, if the beet is topped too far up, so that a small part of the top remains on the beet, the sugar factory penalizes the farmer, the penalty being generally assessed as decided by the factory.

Hence, it is of great importance to the farmer that the beets be topped as nearly as possible to the exact top of the beet, yet without leaving on the beet enough top to result in a penalty by the sugar factory.

The object of this invention, therefore is to provide a process wherein substantially all of the operations are carried out by mechanical means, hand labor being relied upon only for the proper location of the topping operation upon each individual beet.

A further object of this invention is to provide mechanical means which combined with the proper manual operation will result in the carrying out of our process.

Our process consists in first, mechanically removing the beets from the ground and mechanically removing the adhering earth from the beets and depositing the beets upon a platform or picking table; second, manually picking the beets from the platform or table and placing each beet upon a moving topping conveyor with the beets carefully located transversely with respect to the conveyor; third, mechanically moving the beets that have been manually placed upon the topping conveyor against a topping knife having a set position adjacent to and parallel with respect to the conveyor, so that proper care in the manual location of the beets on the topping conveyor will result in the topping cut being placed at exactly the right height at the top of each beet, but without leaving any of the tops upon the beets; fourth, mechanically separating the tops and the beets by permitting the tops to fall when cut from the beets, while the beets still remain held upon the topping conveyor; fifth, mechanically removing the beets from the topping conveyor. (The fourth and fifth steps may be carried out practically simultaneously or as a single step, but we prefer to consider them as two steps for the sake of clarity in explanation.) Sixth, the beets when removed from the topping conveyor may be allowed to drop to the ground, if desired, or may be caught in sacks or a hopper or bin carried by the machine, or may be allowed to drop directly into a wagon, cart or truck moving along with the machine. This sixth step may not properly be a part of our process, but at least it is carried on in conjunction with the other steps of our process.

Our machine to assist in the carrying out of our process may be described as follows:—

First: a beet digger or puller of any proper construction which will properly remove the beets from the ground to a traveling digging conveyor. Some types or constructions of potato diggers or pullers may be used as this part of our machine; also some types and construction of beet pullers. In any case this part of the machine is to be provided with all the necessary adjustments and devices for its proper operation, so that with certainty the beets may be removed from the ground without undue injury, delivered to the traveling digging conveyor, and properly discharged from the digging conveyor.

Second: A platform or picking table composed of transversely extending rods or tubes, or of some other proper construction which will support the beets delivered thereto by the digging conveyor, but which will permit earth in lumps and otherwise, which may be delivered with the beets to the platform or table to fall through as the machine moves along.

Third: Steps on each side of the platform or table, each step to accommodate one or more men acting as pickers, the steps each being provided with guard rails, padded if desired, and fitting partly about the torso of each picker to steady him and hold him so he can devote all his thought and energy to the work upon the beets, and to positively prevent him even accidentally getting dangerously close to the topping knives.

Fourth: A traveling topping conveyor provided with means for holding beets and upon which the beets may be quickly placed by the pickers in such a position that the knives will top the beets at the proper height. This topping conveyor is at its one end adjacent to the platform or picking table and at its other end passes under topping knives which will be mentioned hereinafter.

Fifth: Topping knives adjacent the topping conveyor and adapted to cut the tops from each beet carried to the knives by the topping conveyor. The tops when removed by the knives being permitted to fall to the ground.

Sixth: A kick-off cam adjacent the topping conveyor so placed that it will remove the beets from the conveyor after the tops have been cut from the beets. The beets when removed from the topping conveyor, may be allowed to fall to the ground, but we prefer that they be caught in sacks or hoppers or bins carried by the machine, or by trucks, trailers, wagons or carts traveling along with the machine.

All of the above concerning our machine is described in detail below and is fully illustrated in the drawings, in which;

Figure 1 is a side elevation of our machine.

Figure 2 is a plan view of Figure 1.

Figure 3 is an enlarged section on the line 3—3 of Figure 2 showing a topping knife, the adjacent topping conveyor and a kick-off cam.

Figure 4 is a detail showing a perspective view of the beet-holding spines and cross bar of the topping conveyor.

Figure 5 is a detail showing the mounting of the beet holding spines and cross bar upon the chains of the topping conveyor.

Figure 6 is a partial section on the line 6—6 of Figure 1, showing a topping knife, a kick-off cam, and three topping conveyor cross bars and beet-holding spines.

Figure 7 is a partial section on the line 7—7 of Figure 6, showing a topping knife, a topping conveyor cross bar, and a set of beet-holding spines, and with a beet held in position by the beet-holding spines and being topped by the topping knife indicated by dotted lines.

In Figures 1 and 2 it will be seen that the height of the plows or pullers 1, may be regulated by the different positions of the hand lever 2. Part of the weight of the machine is carried by the wheels 3, and the movement of the handle 2 merely varies the relative vertical positions of the wheels 3 and the pullers 2. The machine is pulled along by a team, a truck or a tractor attached to the draw bar 4 or secured to the machine in any other proper manner.

The disk knives 5 act to cut the ground surface so it may be more easily broken and with less chance of damage to the beets, in case the ground happens to have a hard top crust, which the knives 5 will cut. The usual vertical adjustment and swivel movement of the knives 5 are provided.

The pullers 1 are properly mounted upon the frame 7 and are also braced to the digging conveyor frame 8. The pullers 1 have the attached conveyor rods 9, which act to deliver the beets to the digging conveyor 10 while permitting much of the earth to fall through them to the ground.

The digging conveyor 10 moves the beets and the adhering earth upward, and in this movement much or most, and at times all of the remaining earth is separated from the beets and permitted to fall to the ground.

As shown in the drawings, the digging conveyor is driven by the lugged wheels 11, the gears 12 and 13, the sprockets 14 and 15 and the chain 16. Any other proper method of driving the digging conveyor 10 may be employed whether the actual power comes from whatever is used to pull the machine, which is the case in the construction shown in the drawings, or whether some other and separate source of power is employed, since the final result in any case will be the same, in that the digging conveyor 10 will be operated at the proper speed for the best all around results.

The machine as so far described is substantially the same as some potato diggers and as some beet pullers. Therefore the balance of our machine, which we are about to describe, may if desired be attached to a proper puller unit, or the entire machine may be made as one complete production assembly instead of as two attachable units. This will depend upon conditions, and the judgment and decision of the parties interested in each case.

The topping frame 17 may be riveted as shown in the drawings to the digging conveyor frame, or made integral therewith as desired. The topping frame 17 carries the bars 18 to form the topping platform or picking table, this may be formed in any other proper manner, so long as it will receive the beets discharged from the digging conveyor 10, and will permit earth to fall through to the ground while holding the beets.

The topping frame 17 carries the steps 19, and the body guards 20. Pickers are to stand upon the steps 19 and they are to be located and steadied by the body guards 20. As shown these guards 20 are not padded, nor are they formed to fit closely about the torso of one or more pickers. The padding of the guards, and their exact contour may be a matter of individual choice and taste. The duty of the guards 20 is to make the pickers feel secure on the steps while they are at work, regardless of the bumping and jolting of the machine, and to positively prevent the pickers from getting close to the topping knives.

The topping conveyor 21 is carried by the frame 17 and is properly driven by the chain 22, which in turn is driven by the lugged wheels 11, the gears 12 and 13 and the sprocket 23. Or the topping conveyor may be driven in any other manner from the beet digging portion of the machine, or it may be driven by any other proper source of power, since in the end the result is the same in that the topping conveyor would be driven at a rate at least equal to the rate at which the pickers can properly and accurately place the beets upon the spines of the topping conveyor.

The topping conveyor 21 is provided with cross bars 24, which carry spines 25, upon which the pickers place the beets. Any other proper construction or means by which the beets may be quickly and accurately positioned upon the topping conveyor may be employed so long as the results in speed, accuracy and dependability are satisfactory.

The knives 26 are carried by the frame 17 and the topping conveyor 21 moves the beets carried by the spines 25 against the knives 26, thus cutting off the tops of the beets. With a little practice the pickers are able to both quickly and accurately place the beets on the spines 25 so that the knives 26 will top the beets at almost exactly the proper height; that is without wasting much if any of the beets and without leaving enough of the tops on the beets to result in a penalty by the sugar factory.

We have found this type and construction of knife very satisfactory. However, any other type, kind, construction or operation of knife may be employed in our machine so long as it has a set cutting position adjacent to and parallel with respect to the topping conveyor, so that proper transverse position of each beet on the topping conveyor will result in the beets being topped by the knives at the proper height on each beet.

The kick-off cams 27 are carried by the frame 17 adjacent the knives 26, and their contour is such as to result in the beets being removed from the spines 25 as they travel along after the tops have been cut off by the knives.

The sacks, hoppers, bins, wagons, carts, or trucks which may be employed to catch the beets as they are kicked off of the topping conveyor are not shown in the drawings, since they are perhaps not actually a part of our machine, although they are necessary for the complete performance of the harvesting and topping of the beets. Any other proper type or construction of kick-off may be employed in conjunction with any other type or kind of knife and of topping conveyor and means of holding the beets thereon, so long as the final results are substantially the same and are satisfactory. The final results in any case being that the beets are accurately positioned with respect to the knives, are topped by movement in contact with the knives at the proper height, and are then removed from the conveyor and in some manner properly collected.

It will now be seen more clearly that the picking and topping part of our machine may be manufactured as a unit to be attached to some proper digging unit in a way as an accessory thereto; or the two units may be built at the same time as one single unit or machine.

The numbers of pickers each step is to carry and to which are to be properly fitted the body guards, will depend upon various conditions including, of course, the speed at which the machine is moved and the number and speed of delivery of the beets to the picking table, and the ability of the pickers to keep up with the delivery of the beets to the table.

Having now described our process and our machine by the aid of which our process may be carried out, what we claim as new and desire to protect by Letters Patent is as follows:

1. In a beet topping device, a frame comprising horizontal side members supporting cross members equally spaced at right angles thereon to form a picking platform for receiving dug beets, steps and body guards mounted on said frame for supporting and positioning manual operatives, a topping conveyor carried by said frame and provided with cross members bent to slope upward toward the center from each end to conform to the contour of the beet to provide additional support for the said beet, and having beet holding means supported at opposite ends of said cross members, and upon which beets are manually positioned by said operators, knife means supported at an angle on said frame adjacent to and parallel with said topping conveyor and spaced along same at each side thereof, to contact the beets as the movement of the said conveyor moves the beets held thereon, means to move said conveyor and thereby top the beets, and cam means carried by said frame adjacent the conveyor to remove the beets from the topping conveyor.

2. In a beet topping device, a frame comprising side members supporting spaced cross members thereon to form a picking platform for receiving dug beets, steps and body guards mounted on said frame for supporting and positioning manual operatives, a topping conveyor carried by said frame and provided with cross members bent to slope upward toward the center from each end to conform to the contour of the beet to provide additional support for the said beet, and having beet holding means carried at opposite ends of said cross members, and upon which beets are manually positioned by said operatives, knife means whose cutting edge faces downwardly toward the conveyor carried by the frame adjacent and parallel said topping conveyor and spaced along same at each side thereof, to contact the beets as the movement of the said conveyor moves the beets held thereon, means to move the said conveyor and thereby top the beets, and means carried by the said frame adjacent the conveyor to remove the beets from the topping conveyor.

3. In a beet topping device, a frame comprising side members supporting spaced cross members thereon to form a picking platform for receiving dug beets, steps and body guards mounted on said frame for supporting and positioning manual operatives, a topping conveyor carried by said frame and provided with cross members formed to slope upward toward the center from each end to conform to the contour of the beet to provide additional support for said beet, and having beet holding means carried at opposite ends of said cross members, including marginal beet holding means substantially aligned with the extremities of said conveyor, and upon which beets are manually positioned by said operatives, knife means whose cutting edge faces downwardly toward the conveyor in substantial alignment with said marginal beet holding means carried by the frame and substantially parallel with each side of the conveyor to contact the beets as the movement of the conveyor moves the beets thereon, means to move the conveyor and thereby top the beets, and means carried by the frame to remove the beets from the conveyor.

4. In a beet topping device, a frame comprising side members supporting spaced cross members thereon to form a picking platform for the dug beets, steps and body guards mounted on said frame for supporting and positioning manual operatives, a topping conveyor carried by said frame and provided with cross members having spaced upwardly extending portions formed to slope upward toward the center from each end to conform to the contour of the beet to provide additional support for the said beet and upon and between which the beet will tend to center and wedge itself, and upon which cross members, beets are manually positioned by said operatives, knife means whose cutting edge faces downwardly toward the conveyor to contact the beets and to increase their wedging action upon said cross members while topping the beets as the movement of the said conveyor moves the beets held thereon, means to move the said conveyor and thereby top the beets, and means carried by the frame to remove the beets from the conveyor.

5. In a beet topping device, a frame, a topping conveyor carried by the frame and provided with cross members formed to slope upward toward the center from each end to conform to the contour of the beet to provide additional support for said beet, and having beet holding means carried at opposite ends of said cross members, including marginal beet holding means substantially aligned with the extremities of said conveyor, and upon which, beets are manually positioned, knife means whose cutting edge faces downwardly toward the conveyor in substantial alignment with said marginal beet holding means carried by the frame and substantially parallel with each side of the conveyor to contact beets as the movement of the conveyor moves the beets thereon, means to move the conveyor and thereby top the beets thereon, and means carried by the frame to remove the beets from the conveyor.

6. In a beet topping device, a frame, a topping conveyor carried by the frame and provided with cross members formed to slope upward away from one margin to conform to the contour of the beet to provide additional support for said beet, and having marginal beet holding means substantially aligned with the margin of said conveyor and upon which beets are manually positioned, knife means whose cutting edge faces downwardly toward said conveyor in substantial alignment with said marginal beet holding means carried by the frame and approximately parallel with the margin of said conveyor to contact the beets as the movement of the conveyor moves the beets thereon, means to move the conveyor and thereby top the beets thereon, and means carried by the frame to remove the beets from the conveyor.

7. In a beet topping device, a frame, a topping conveyor carried by said frame and provided with cross members having spaced, upwardly extending portions formed to slope upward toward the center from each end to conform to the contour of the beet to provide additional support for the said beet and upon and between which the beet will tend to center and wedge itself, and upon which cross members, beets are to be manually positioned, knife means whose cutting edge faces downwardly toward the conveyor to contact the beets and to increase their wedging action upon said cross members while topping the beets as the movement of the conveyor moves the beets held thereon, means to move the conveyor and thereby top the beets, and means carried by the frame to remove the beets from the conveyor.

8. In a beet topping device, a frame, a topping conveyor carried by the frame and provided with cross members having spaced, upwardly extending portions formed to slope upward away from one margin to conform to the contour of the beet to provide additional support for the beet and upon and between which the beet will tend to center and wedge itself, and upon which cross members, beets are to be manually positioned, knife means whose cutting edge faces downwardly toward the conveyor to contact the beets and to increase their wedging action upon said cross members while topping the beets as movement of the conveyor moves the beets held thereon, means to move the conveyor and thereby top the beets, and means carried by the frame to remove the beets from the conveyor.

CARL B. DANIELS.
ERNEST J. GRAHAM.